Sept. 8, 1931.  W. L. HUDSON ET AL  1,822,217
JOINT FASTENER
Filed Sept. 26, 1929

Inventor
W. L. Hudson,
W. F. Eckardt
By Watson E. Coleman
Attorney

Patented Sept. 8, 1931

1,822,217

UNITED STATES PATENT OFFICE

WALTER LAFAYETTE HUDSON AND WILLIAM FREDERICK ECKARDT, OF GREENSBORO, NORTH CAROLINA

JOINT FASTENER

Application filed September 26, 1929. Serial No. 395,390.

This invention relates to fastening devices for securing miter joints, butt joints or any other type of joint where it is desirable that abutting members be drawn firmly together.

The primary object of the present invention is to provide a fastener which, when placed in position across a joint between two bodies of wood, will act in being forced into position to draw the edges or abutting surfaces of the bodies firmly together.

Another object of the invention is to provide a fastener of the above described character having holding teeth which will prevent the fastener from slipping from position until additional holding elements such as nails or screws may be placed in position to further attach the fastener to the bodies with which it is in contact.

Still another object of the invention is to provide a joint fastener of the above described character which is of simple construction, strong and durable and designed to be easily and inexpensively manufactured.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawings:—

Figure 1:
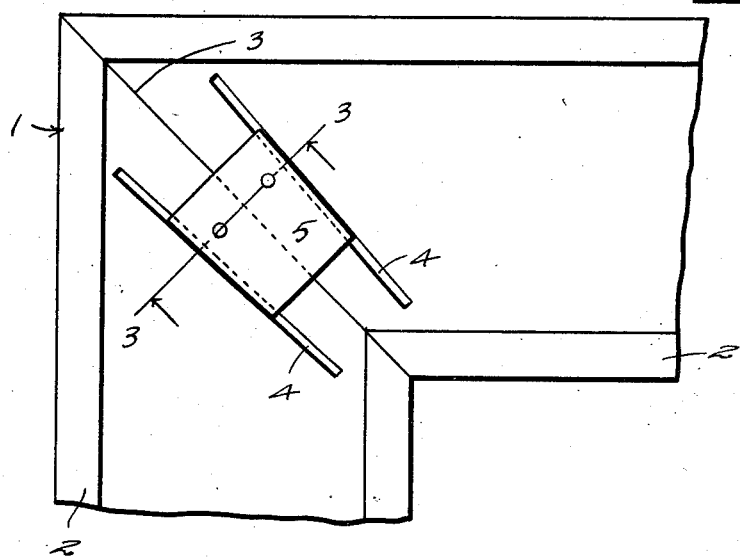
Figure 1 is a view in plan of the fastener embodying the present invention showing the same applied.
Figure 2:
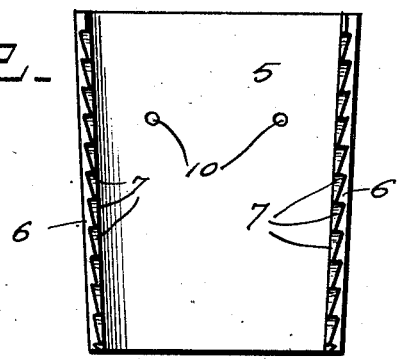
Figure 2 is a bottom plan view of the fastener.
Figure 3:
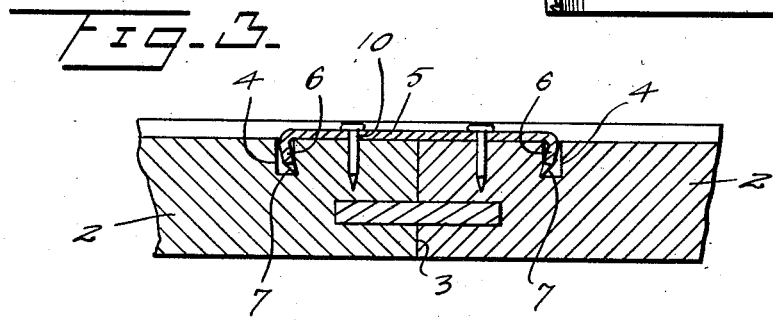
Figure 3 is a sectional view taken on the line 3—3 of Figure 1.
Figure 4:
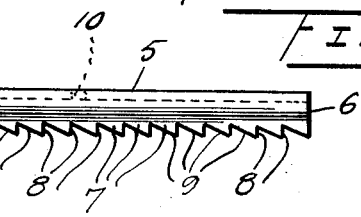
Figure 4 is a view in side elevation of the fastener per se.

Referring more particularly to the drawing the numeral 1 indicates a corner of a frame wherein two bodies 2 are brought together to form the angle or miter joint 3. In the formation of such a joint the under faces of the abutting bodies are provided at opposite sides of the joint with the divergent grooves or kerfs 4 as shown.

The fastener embodying the present invention is indicated generally by the numeral 5 and as shown comprises a plate of metal preferably of about sixteen gauge sheet metal, of greater width at one end than at the other. This plate is flat throughout and has each side edge turned to extend downwardly and inwardly as indicated at 6. These down turned and inwardly extending side portions or flanges 6 are each provided with a plurality of teeth 7 each of which as shown has a straight face 8 and an elongated inclined face 9, the points of the teeth 7 being directed toward the narrower end of the plate.

The body of the plate 5 is also provided adjacent its widest end with apertures 10 through which suitable securing elements such as screws or nails may be passed when the fastener is in place.

In the application of the fastener device the same is placed in position over the joint 3 of the work with the toothed down turned flanges in position for engagement in the outwardly diverging kerfs 4 formed in the surface of the abutting bodies. When the toothed flanges are in position in the kerfs the plate is then driven toward the divergent ends thereof so that the inturned edges of the flanges will bite into the adjacent walls of the kerfs and the inclined faces of the teeth will move over the bottom thereof. It is, of course, apparent that the teeth 8 will at the same time bite into the wood so that it will be readily seen that reverse movement of the plate flanges in the kerfs will be prevented as the points of the teeth will oppose this movement. At the same time that the toothed edges of the flanges 6 bite into the wood in which the kerfs are formed and in which the flanges in turn position the abutting edges of the pieces 2 forming the joint 3 will be drawn firmly together. Suitable fasteners may then be passed through the apertures 10 of the fastener plate so as to prevent relative movement between the members 2.

While we have particularly shown and described a plate in which the flanges 6 are provided with teeth it is, of course, obvious that a plate may be employed having flanges without the teeth shown. However, it will be readily seen that the provision of the teeth greatly facilitates the easy application of the fastener to a piece of work and this construction would be of course preferred.

It is also to be understood that while the device has been shown as applied to a miter joint it is not to be restricted to such use for it is obvious that it may be applied to other types of joints, as for example a butt joint where an end of one piece of work is brought into abutting engagement with a side edge of a transversely extending piece.

Having thus described my invention, what we claim is:—

1. A fastener of the character described for joining together contacting edges of two bodies having divergently related kerfs therein and upon opposite sides of said edges, comprising a plate body having divergently related opposed edges, flanges formed integral with said edges and projecting from one face of the plate to be slidably engaged in said kerfs, and means whereby the edges of said flanges will be caused to bite into the adjacent side walls of the receiving kerfs to prevent reverse movement and disengagement of the plate from the bodies.

2. A joint fastener comprising a plate having divergently related opposed edges, integral flanges formed along each of said edges, said flanges being turned to extend inwardly beneath the adjacent face of the plate and designed for frictional engagement in receiving kerfs formed upon opposite sides of a joint, and teeth formed along the longitudinal edge of each of said flanges for engagement in the body with which they are in contact, said teeth having their points directed toward the narrower end of the plate to prevent reverse movement of the plate after sliding the flanges in one direction in the receiving kerfs.

In testimony whereof we hereunto affix our signatures.

WALTER L. HUDSON.
WILLIAM F. ECKARDT.